(12) United States Patent
Ye et al.

(10) Patent No.: US 12,506,572 B2
(45) Date of Patent: Dec. 23, 2025

(54) METHODS FOR INDICATING THE AVAILABILITY OF THE REFERENCE SIGNAL FOR IDLE/INACTIVE USER EQUIPMENTS

(71) Applicant: Apple Inc., Cupertino, CA (US)

(72) Inventors: Sigen Ye, San Diego, CA (US); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Sethuraman Gurumoorthy, Cupertino, CA (US); Seyed Ali Akbar Fakoorian, San Diego, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 505 days.

(21) Appl. No.: 17/710,292

(22) Filed: Mar. 31, 2022

(65) Prior Publication Data

US 2022/0321296 A1 Oct. 6, 2022

Related U.S. Application Data

(60) Provisional application No. 63/171,004, filed on Apr. 5, 2021.

(51) Int. Cl.
*H04L 5/00* (2006.01)
*H04L 1/1607* (2023.01)
(Continued)

(52) U.S. Cl.
CPC .......... *H04L 5/0048* (2013.01); *H04L 1/1614* (2013.01); *H04W 68/005* (2013.01); *H04W 72/23* (2023.01)

(58) Field of Classification Search
None
See application file for complete search history.

(56) References Cited

U.S. PATENT DOCUMENTS

2013/0044685 A1* 2/2013 Fong .................... H04J 11/0053
370/328
2018/0175992 A1* 6/2018 Fröberg Olsson .... H04L 5/0094
(Continued)

FOREIGN PATENT DOCUMENTS

CN 110226351 A 9/2019
CN 110463260 A 11/2019
(Continued)

OTHER PUBLICATIONS

Vivo, "TRS/CSI-RS occasion(s) for idle/inactive UEs", Oct. 26-Nov. 13, 2020, 3GPP Draft, R1-2007674, p. 1-9.*
(Continued)

*Primary Examiner* — Adnan Baig
(74) *Attorney, Agent, or Firm* — Sterne, Kessler, Goldstein, & Fox P.L.L.C.

(57) ABSTRACT

An approach to providing an indication of the availability of tracking reference signal (TRS) and/or channel state information reference signal (CSI-RS) occasions. Channels for carrying the indication include system information block (SIB) signaling, paging physical downlink control channel (PDCCH), and paging early indications. Various approaches are described that provide the information, including a number of bitmap approaches, a hierarchical informational approach, a dynamic signal indication that carries configuration indices. Additional approaches are described that reduce unnecessary overhead by specifying certain reference signal (RS) occasions as being available.

18 Claims, 10 Drawing Sheets

(51) Int. Cl.
*H04W 68/00* (2009.01)
*H04W 72/23* (2023.01)

(56) References Cited

U.S. PATENT DOCUMENTS

| | | | |
|---|---|---|---|
| 2019/0356524 A1* | 11/2019 | Yi ..................... | H04L 27/2655 |
| 2021/0288773 A1* | 9/2021 | Lin .................... | H04W 56/001 |
| 2023/0078444 A1* | 3/2023 | Maleki .............. | H04W 52/0229 370/311 |
| 2023/0087737 A1 | 3/2023 | Zhou et al. | |
| 2023/0143590 A1* | 5/2023 | Li ........................ | H04L 5/0051 370/329 |
| 2023/0189211 A1* | 6/2023 | Lauridsen ............... | H04L 5/005 455/458 |
| 2023/0319608 A1* | 10/2023 | Matsumura ........... | H04L 5/0053 370/252 |
| 2024/0015650 A1* | 1/2024 | Ren ................... | H04W 52/0216 |
| 2024/0064637 A1* | 2/2024 | Gurumoorthy ... | H04W 56/0035 |
| 2024/0163846 A1* | 5/2024 | Sheng ................ | H04W 68/025 |

FOREIGN PATENT DOCUMENTS

| | | |
|---|---|---|
| CN | 111385826 A | 7/2020 |
| EP | 3595226 A1 | 1/2020 |
| GB | 2597535 A | 2/2022 |
| WO | WO2018/175891 A1 | 9/2018 |
| WO | WO2019/029711 A1 | 2/2019 |
| WO | WO2020/221711 A1 | 11/2020 |

OTHER PUBLICATIONS

3GPP TSG RAN WG1; vivo, "TRS/CS-RIS occasion(s) for idle/inactive UEs" (Meeting No. 103-e), R1-2007674, Agenda Item No. 8.7.1.2, Oct. 26-Nov. 13, 2020; 9 pages.

Extended European Search Report for European Application No. 22165919.6, European Patent Office, Germany, mailed Sep. 6, 2022, 7 pages.

Hai-Yan Wei et al., "A Method of Rapid Transmission on ISM Band for LTE System", Journal of Anhui University (Natural Science Edition), Mar. 2013, vol. 37, No. 2, 6 pages.

"Physical layer procedures for control" (Release 15), 3GPP TS 38.213 V15.5.0, $3^{rd}$ Generation Partnership Project, Mar. 2019, 104 pages.

"Discussion on TRS CSI-RS for RRC-IDLE and RRC-INACTIVE State UE," R2-2102863, 3GPP TSG-RAN WG2 Meeting #113-bis electronic; Xiaomi Communications, Apr. 12-20, 2021 (online), 5 pages.

"5G UE Measurements and Reporting." Version 7, Mar. 10, Accessed Nov. 12, 2023, https://devopedia.org/5g-ue-measurements-and-reporting, Developedia 2021, 9 pages.

* cited by examiner

| RS configuration index | Corresponding beam | Availability indicated in SIB | Availability indicated in PDCCH |
|---|---|---|---|
| 1 | 0 | 0 | 0 |
| 2 | 0 | 1 | |
| 3 | 0 | 0 | 1 |
| 4 | 1 | 1 | 1 |
| 5 | 1 | 0 | 1 |
| 6 | 1 | 0 | |
| 7 | 2 | 0 | 0 |
| 8 | 2 | 0 | 0 |
| 9 | 3 | 0 | 1 |
| 10 | 3 | 1 | |
| 11 | | 0 | 0 |

*FIG. 4*

```
ssb-PositionsInBurst       SEQUENCE {
    inOneGroup                 BIT STRING (SIZE (8)),
    groupPresence              BIT STRING (SIZE (8))           OPTIONAL - Cond FR2-Only
}
```

| Configuration index | Index within the group | | | | | | | |
|---|---|---|---|---|---|---|---|---|
| Group index | 1 | 2 | 3 | 4 | 5 | 6 | 7 | 8 |
| 1 | 0 | 1 | 2 | 3 | 4 | 5 | 6 | 7 |
| 2 | 8 | 9 | 10 | 11 | 12 | 13 | 14 | 15 |
| 3 | 16 | 17 | 18 | 19 | 20 | 21 | 22 | 23 |
| 4 | 24 | 25 | 26 | 27 | 28 | 29 | 30 | 31 |
| 5 | 32 | 33 | 34 | 35 | 36 | 37 | 38 | 39 |
| 6 | 40 | 41 | 42 | 43 | 44 | 45 | 46 | 47 |
| 7 | 48 | 49 | 50 | 51 | 52 | 53 | 54 | 55 |
| 8 | 56 | 57 | 58 | 59 | 60 | 61 | 62 | 63 |

*FIG. 5*

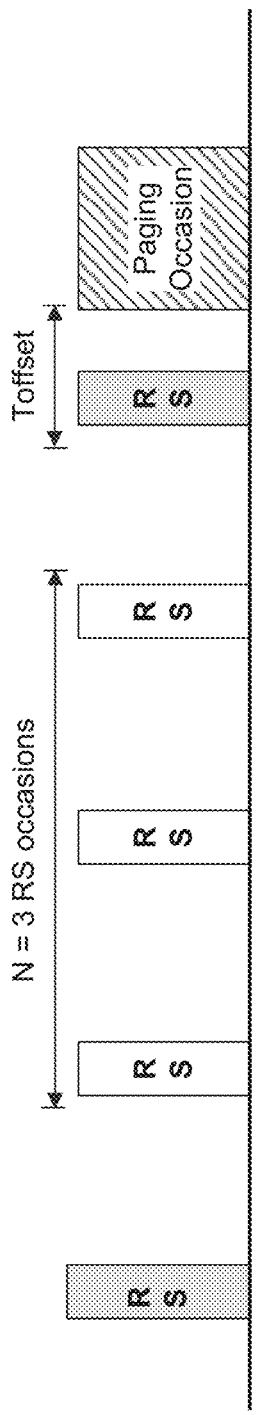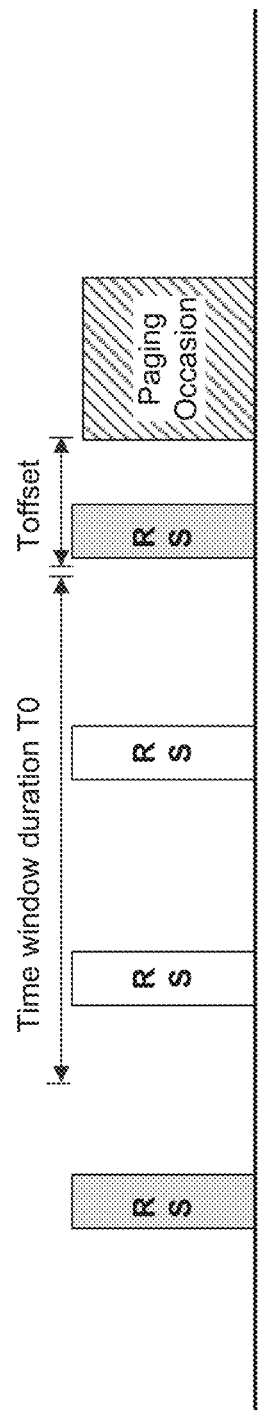

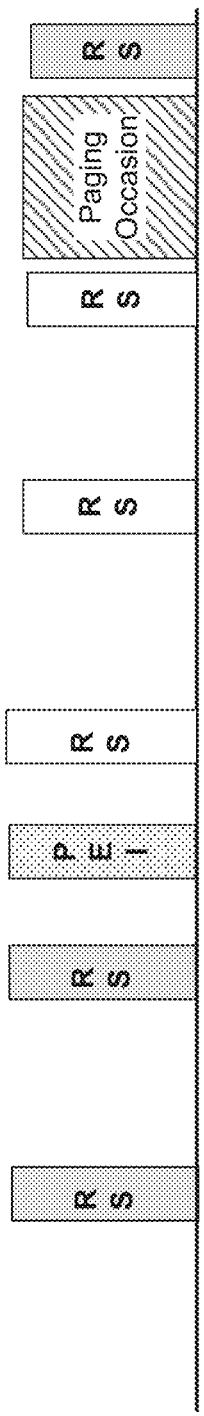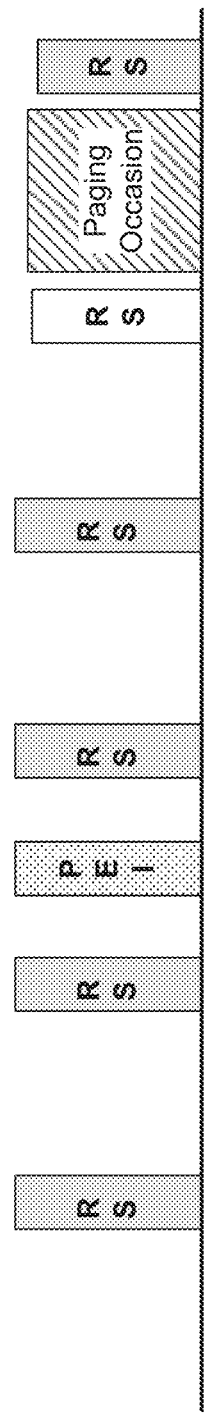

METHODS FOR INDICATING THE AVAILABILITY OF THE REFERENCE SIGNAL FOR IDLE/INACTIVE USER EQUIPMENTS

CROSS REFERENCE TO RELATED APPLICATIONS

This application claims the benefit of U.S. Provisional Application No. 63/171,004, filed Apr. 5, 2021, which is incorporated by reference herein in its entirety.

BACKGROUND

Field

Various aspects generally may relate to the field of wireless communications.

SUMMARY

Aspects of the approach described herein include a user equipment (UE). The UE includes a radio frequency (RF) receiver configured to receive a downlink signal from a base station. The UE also includes processing circuitry coupled to the RF receiver, the processing circuitry configured to decode the downlink signal, wherein the downlink signal includes a reference signal (RS) information element, the RS information element indicating an availability of one or more RS configurations. The processing circuitry of the UE is further configured, using the one or more RS configurations that are indicated as available and the RF receiver, to track at least one of time or frequency, wherein the downlink signal is received while the UE is in an inactive or idle condition.

Aspects of the approach also include a method that includes the step of receiving, by a radio frequency (RF) receiver in a user equipment (UE), a downlink signal from a base station. The method further includes decoding, by processing circuitry coupled to the RF receiver, the downlink signal, wherein the downlink signal includes a reference signal (RS) information element, the RS information element indicating an availability of one or more RS configurations. The method further includes tracking, by the processing circuitry and using the one or more RS configurations that are indicated as available, at least one of time or frequency, wherein the downlink signal is received while in an inactive or idle condition.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 4 illustrates an illustration of how a hierarchical information element indicating availability of RS configurations, in accordance with aspects of this disclosure.

FIG. 5 provides an illustration of an RS configuration availability bitmap, according to aspects of the disclosure.

FIGS. 6A and 6B provide illustrations of an RS occasions relative to a paging occasion, according to aspects of the disclosure.

FIGS. 7A and 7B provide illustrations of an RS occasions relative to a paging occasion and a paging early indication, according to aspects of the disclosure.

Figure 1:
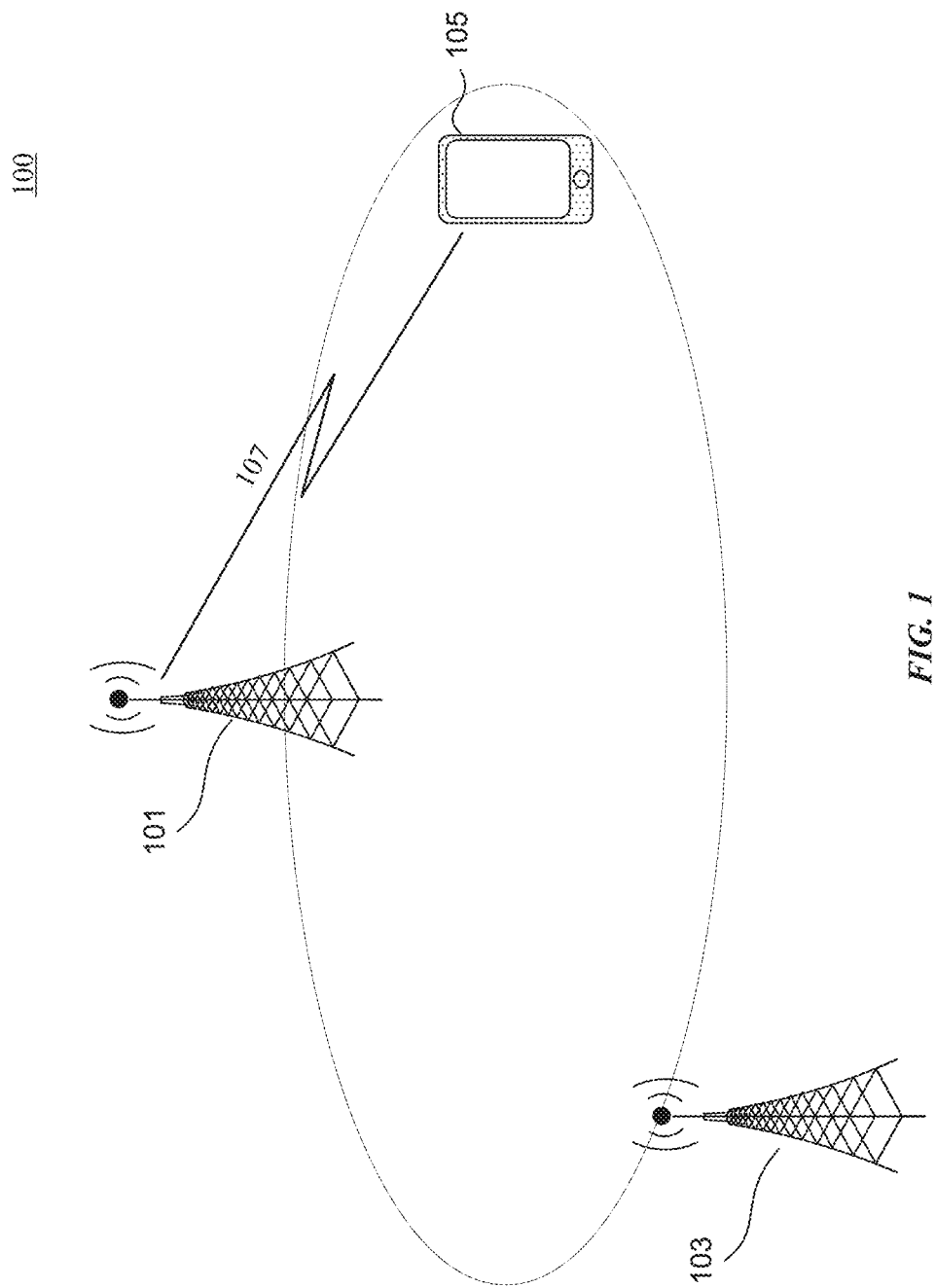
FIG. 1 illustrates an example system implementing mechanisms for signaling availability of RS configurations, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 illustrates an example system implementing mechanisms for signaling availability of RS configurations, according to some aspects of the disclosure. Example system 100 is provided for the purpose of illustration only and does not limit the disclosed aspects. System 100 may include, but is not limited to, network nodes (for example, base stations such as eNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using the 3GPP standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network node 101 (herein referred to as a base station) can include nodes configured to operate based on a wide variety of wireless communication techniques such as, but not limited to, techniques based on 3GPP standards.

According to some aspects, UE 105 and base stations 101 and 103 are configured to implement mechanisms for UE 105 to signaling RS configuration availabilities. In some aspects, UE 105 is configured to receive signaling of RS configuration availabilities, and to perform time and/or frequency tracking based on those RS configurations. According to some aspects, UE 105 can be connected to and can be communicating with base station 101 (e.g., the serving cell) using carrier 107 from which UE 105 receives the signaled RS configuration availabilities.

According to some aspects, UE 105 can measure one or more carriers (e.g., carrier 107) used for communication with base station 101 (e.g., the serving cell) to perform time and/or frequency tracking based on those RS configurations.

Figure 2:
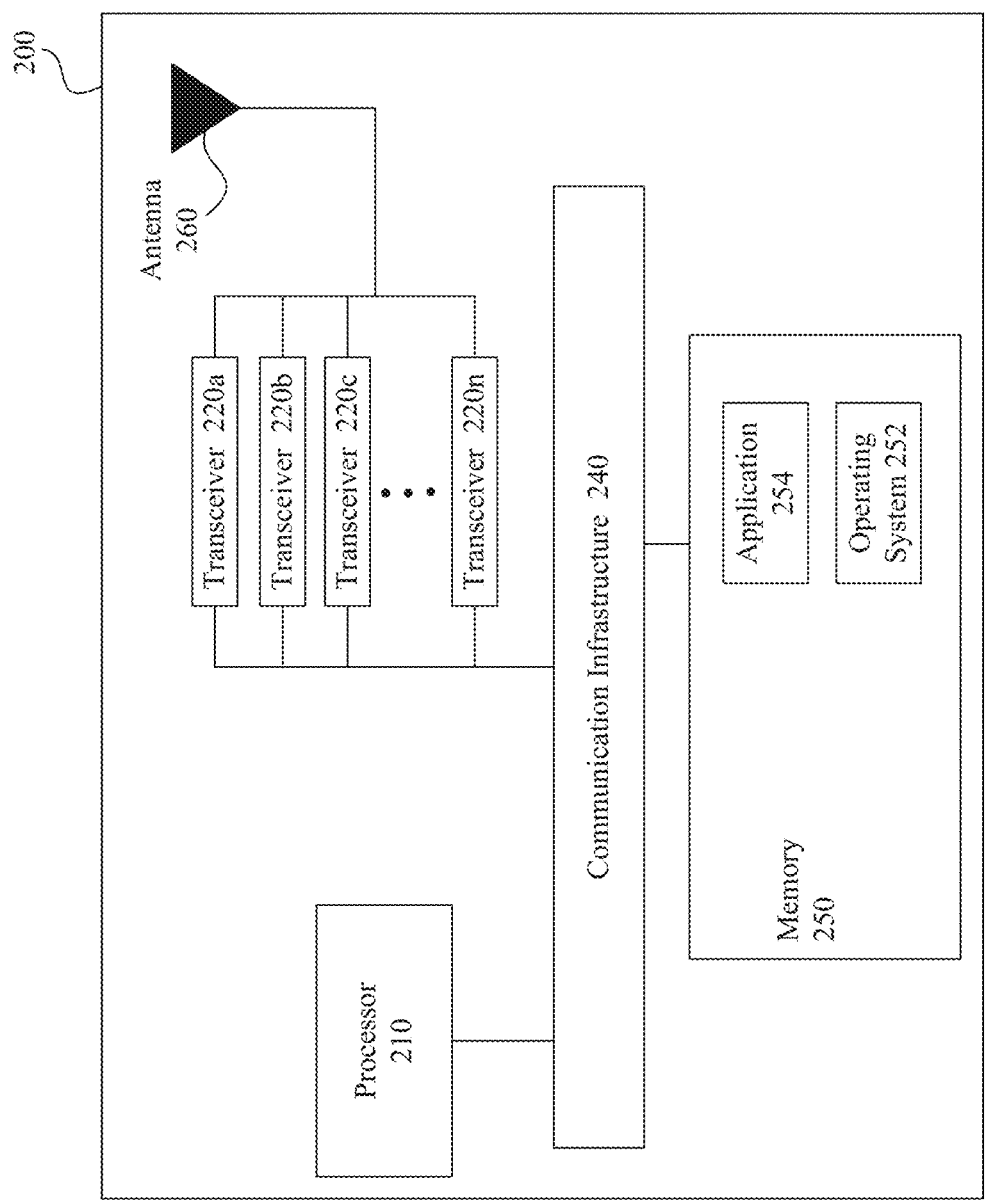
FIG. 2 illustrates a block diagram of an example system of an electronic device receiving and processing the signaled availability of RS configurations, according to some aspects of the disclosure.

FIG. 2 illustrates a block diagram of an example system 200 of an electronic device implementing mechanisms for time and/or frequency tracking based on signaled RS configuration availabilities, according to some aspects of the disclosure. System 200 may be any of the electronic devices (e.g., base station 101, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus.

Processor 210 together with instructions stored in memory 250 performs operations enabling system 200 of system 100 to implement mechanisms for exchanging a searcher number for carrier/cell detection and measurement, as described herein. Additionally, or alternatively, one or more transceivers 220a-220n perform operations enabling system 200 of system 100 to implement mechanisms for performing time and/or frequency tracking based on those RS configurations, as described herein.

One or more transceivers 220a-220n transmit and receive communications signals that support mechanisms for performing time and/or frequency tracking based on those RS configurations, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220a-220n, implements performing time and/or frequency tracking based on those RS configurations, as discussed herein. For example, transceiver 220a can enable connection(s) and communication over a first carrier (for example, carrier 107 of FIG. 1). In this example, transceiver 220a and/or transceiver 220b can enable receipt of signaling of RS configuration availability information (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220a-220n, can implement these operations.

In creating innovating approaches to an efficient signaling of the availability of reference signals, it is understood that idle and/or inactive UEs receive information on the availability of the reference signals by an explicit indication. There is no intended blind detection of presence or absence of the reference signals at the UE side of the communication. The approaches described below provide the nature of the signaling, the information conveyed, and the details of how it is conveyed from a base station to the UE.

In formulating innovative approaches, it is noted that the availability of TRS/CSI-RS occasions may be carried in a paging early indication (PEI). A PEI is transmitted some time before a paging occasion so that the UE can decide whether to wake up or not in advance in order to prepare for the paging occasion reception.

Various designs have been formulated for informing the UE of the availability of the reference signals (RS), with the designs using the following signals to convey the availability information: system information block (SIB), physical downlink control channel (PDCCH), and/or PEI. In the evaluation and comparison of different PEI candidate designs, there are two types of behavior that are relevant to such an analysis. In the first behavior, the PEI indicates to the UE that the UE should monitor a paging occasion (PO) to see whether the UE's group/subgroup is paged. In this first behavior, a UE is not required to monitor a PO if the UE does not detect a PEI at any PEI occasion(s) associated with the particular PO.

In the second behavior, the PEI indicates to the UE whether or not the UE should monitor a PO. In this second behavior, the UE is required to monitor a PO if the UE does not detect a PEI at any PEI occasion(s) for the particular PO.

For purposes of the approaches described herein, an exemplary paging occasion (PO) is a set of "S" consecutive PDCCH monitoring occasions where "S" is the number of actual transmitted synchronization signal blocks (SSBs) that are determined in accordance with the information field ssb-PositionsInBurst in system information block (SIB1).

A PO can include multiple slots. For example, the K-th PDCCH monitoring occasion for paging in the PO corresponds to the K-th transmitted SSB, using the same transmission beam by the network. The PDCCH monitoring occasions for paging (which do not overlap with UL symbols, as determined according to tdd-UL-DL-ConfigurationCommon) are sequentially numbered from zero starting from the first PDCCH monitoring occasion for paging in the paging frame (PF).

Figure 3:
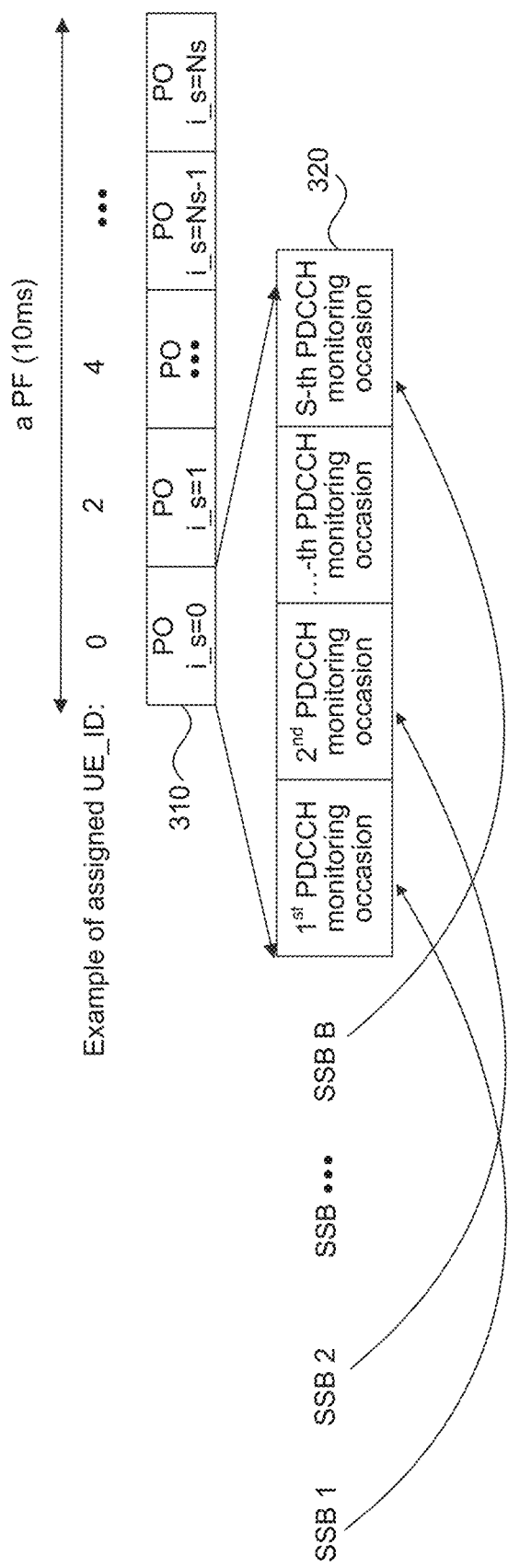
FIG. 3 illustrates aspects of the slot configuration, in accordance according to some aspects of the disclosure.

FIG. 3 illustrates aspects of the slot configuration described above, according to some aspects of the disclosure. A paging frame with exemplary duration of 10 ms is illustrated with examples of assigned UEs having identifications of 0, 2, 4, etc. A sequence of paging occasions 310 within the paging frame, beginning with the first paging occasion i_s=0, and ending with i_s=Ns. In the illustration, within each paging occasion, there are a sequence of S monitoring occasions 320, e.g., 1st PDCCH occasion, 2nd PDCCH occasion, . . . , Sth PDCCH monitoring occasion, with a SSB associated with each monitoring occasion. For example, SSB 1 is associated with 1st PDCCH occasion.

Signaling of RS Availability Approaches

In generating the approaches for provision of reference signal availability, it is understood that the availability of the configured TRS/CSI-RS occasions is communicated to the UE by the base station, e.g., a next generation node B (gNB). The signaling candidates for carrying the availability indication include, for example, SIB signaling, paging PDCCH, and paging early indication. In discussing the approaches below, not only are the details for the signaling design provided to convey the availability indication, but opportunities to reduce the reference signal overhead when these signals are not used by connected UEs are also described. In this description, the term reference signal (RS) will be used as a generic term to refer to either tracking reference signals (TRS) or channel state information reference signals (CSI-RS).

To fully understand the scale of information at issue, it is noted that there can be a large number of RS configurations configured by SIB or by dedicated signaling. This is especially true for a wireless network with a large number of beams. By way of example, if the base station, e.g., gNB operates with 64 beams (the max number supported in new radio (NR)) and if there is one RS configuration corresponding to each beam, there are a total of 64 RS configurations. Note that for UEs in an idle and/or inactive state, a beam is typically defined as quasi-colocated with a SSB.

The following descriptions provides a number of options by which the RS availability information may be conveyed. In the first option, a bitmap is used to indicate the availability. In the bitmap, one bit corresponding to each RS configuration, and with each bit providing the indication of whether the corresponding RS configuration is available or not.

The bitmap provides a complete picture of the availability of all of the RS configurations. However, the main drawback of this option is that the overhead is large, especially if there are a large number of beams/RS configurations. For example, assuming 64 beams and one RS configuration for each beam, then a bitmap having 64 bits is needed. This number of bits is too large to be carried in any physical layer signaling such as physical downlink control channel (PDCCH).

In the second option, a bitmap is included to indicate the availability for only the RS configurations that correspond to the same beam as the signal that carries the availability indication. The rationale behind this option is that for a UE monitoring a particular beam, only the RS on the same beam can help the UE with automatic gain control (AGC) and time and/or frequency tracking. Therefore, it is sufficient for the wireless network to indicate the availability of these particular RS configurations. This option is especially useful if the indication is carried by physical layer signaling (e.g., paging PDCCH, paging early indication). This option can also be used when the availability indication is carried in SIB signaling.

Typically, there should not be a large number of RS configurations corresponding to the same beam. In fact, and especially for RS, it is advantageous for the wireless network to configure the same RS for all the UEs that are on the same beam. This solution greatly reduces the signaling overhead, and it does not have a scalability issue with an increasing number of beams.

For this second option, the number of bits for indication should typically be known to the UE. This can be effectuated by having the number of bits pre-defined in specifications, such as the 3GPP specifications, or some other predefined implementation. Alternatively, the number of bits may be broadcast in the SIB.

In a further alternative, the number of bits can be implicitly derived by the UE from the number of RS configurations, e.g., using the maximum number of RS configurations on a beam among all the beams to form a count from which the number of bits may be derived. The actual number of bits (i.e., the actual number of configurations for a particular beam) may be smaller than this derived number, and the UE may use either the LSBs or MSBs among these bits.

In a further aspect of the above approaches, it is noted that a combination of the first option and the second option is also possible. In such a combination, one of the options would override the other option when certain conditions are met. For example, the RS availability indication can be carried by both SIB signaling and PDCCH. In this combination, the availability indication carried in PDCCH can always override the availability indication carried in SIB, or alternatively, the availability indication carried in PDCCH overrides the availability indication carried in SIB over a particular time period. This combination may be used to provide a dynamic availability indication where the availability is relatively stable, but is interrupted by a number of cycles of instability of availability.

In a third option, the availability indication can be provided using a hierarchy structure. In an example, the structure would have a first signal and a second signal. In the first signaling, availability of number of RS are indicated. In the second signal, the availability of the configurations that are indicated as being "not available" in the first signaling. This third option allows the base station, e.g., gNB to include the available indication of the more stable RS configurations in the first signal, while providing an indication of the remaining RS configurations in the second signal.

An example of the third option is as follows. In this example, the SIB signaling provides the first-level indication. A dynamic signaling (e.g., PDCCH) provides the second-level indication, where the second-level indication provides the availability of the configurations that are indicated as not available in first-level indication, e.g., the SIB signaling.

This third option can also be used in combination with the second option. In this combination, the indication in the second signal includes only the configurations that correspond to the same beam. For this combination, the number of bits can be determined in the same way as in the second option. As a further optimization, it can be implicitly derived from the RS configurations (using the maximum number of RS configurations) that are indicated as unavailable in the first signal among all of the beams.

FIG. 4 provides an illustration of how a hierarchical information element indicating availability of RS configurations, in accordance with aspects of this disclosure. In this example, there are four (4) beams (e.g., beam 0, 1, 2, 3) in this system. In FIG. 4, SIB signaling is provided for 3, 4, 2 and 2 RS configurations for beams 0, 1, 2 and 3, respectively. The information carried in SIB is shown in the first 3 columns in the table in FIG. 4. The first column shows in the index of each RS configuration. The second column shows the corresponding beam number. Thus, beam 0 is associated with 3 RS configurations, having RS configuration indices 1 through 3. Beam 1 is associated with 4 RS configurations, having RS configuration indices 4 through 7. Beam 3 is associated with 2 RS configurations, having RS configuration indices 8 and 9. Beam 4 is associated with 2 RS configurations, having RS configuration indices 10 and 11. The third column provides an availability indication for all of the RS configurations. The fourth column provides an availability indication of those RS configurations that are shown as unavailable in the third column. In the example in FIG. 4, those configuration that are shown as unavailable in the third column (and therefore have an entry in the fourth column) are RS configuration index 1, 3, 5 through 9, and 11. This table is exemplary and not limiting. For exactly, the construction of the signaling (including whether a 0 or a 1 or equivalent are used) and/or the order of the configurations is merely exemplary and not limiting.

Continuing with the example of FIG. 4, assuming that the UE derives the number of bits for indication in PDCCH (column 4) based on the RS configurations. The maximum number of configurations indicated as unavailable in SIB (column 3) among the different beams is 3 (beam 1). Therefore, the UE derives 3 bits as being needed for indication.

For the PDCCH to carry the corresponding information indicated in the fourth column in the table in the FIG. 4, the indication in PDCCH is (01x), (110), (01x) or (0xx) if PDCCH is transmitted on beam 0, 1, 2 or 3 respectively. In this example, the left bit corresponds to lower configuration index, and 'x' means a reserved bit that the UE can ignore.

In a fourth option, a bitmap is not used. In this option, a dynamic signal (e.g., PDCCH) carries one or more RS configuration indices corresponding to the same beam as the dynamic signal that are available. In this option, the RS configuration index can be explicitly included as part of the configuration, or implicitly derived by the UE. The RS configuration can be indexed across all beams or separately within each beam. Less overhead is needed if the RS configuration is indexed within each beam. This fourth option is more efficient from overhead perspective if a single index is included for a beam. Otherwise it may be more efficient to use a bitmap. In many cases, it may be sufficient for the UE already to have one configuration available to assist the automatic gain control (AGC) and time and/or frequency tracking.

In a fifth option, a bitmap is included to indicate the availability, with one bit corresponding to a group of RS configurations to indicate whether the configurations are available or not. This fifth option is a variation of the first option, with a reduced overhead but at the cost of a coarse indication granularity. The grouping of RS configurations can be pre-defined, or a parameter (e.g., the number of groups) can be signaled to define the grouping. The fifth option has a further enhancement within this option. In this further enhancement, two bitmaps (rather than a single bitmap) can be used to indicate the RS availability. This is similar to how SIB positions are indicated by ssb-PositionsInBurst via the two entities: inOneGroup and groupPresence. One of the two bitmaps is used to indicate which groups are available, while the second bitmap is used to indicate which configurations within a group are available. This enhancement provides finer granularity with slightly more overhead over the "unenhanced" fifth option.

In certain aspects of these options, when PEI is enabled, the availability signal can be configured by the base station, e.g., gNB, whether the dynamic availability indication is carried in the PEI or paging PDCCH, assuming both are supported.

FIG. 5 provides an illustration of a RS configuration availability bitmap, according to aspects of the disclosure. In the table in FIG. 5, there are a total of 64 configurations, indexed from 0 to 63. In the example shown in FIG. 5, there are 8 groups defined (shown in the first column), with 8 configurations in each group (the row for each respective group index). FIG. 5 shows which configurations are indicated as available (highlighted in gray) if the first bitmap indicates 01010001 (identifying group index 2, 4 and 8 as being available) and the second bitmap indicates 01000101 (the leftmost bit corresponding to index 1). By looking at the intersection of the rows identified by the first bitmap and the columns identified by the second bitmap, squares numbered 9, 13, 15, 25, 29, 31, 57, 61 and 63 are identified as being available.

For the second, third and fourth options, the messages from different beams can be different, when each message carries the availability indication for the configurations associated with its own beam. However, there is the potential for a misunderstanding between a base station and a UE.

When a UE is located in the overlapping region of two beams and the monitoring space for the signaling from two beams also overlaps, a UE may decode the message from the other beam, and wrongly assume that the decoded message is for its own beam. There are different strategies to handle the issue. In the first strategy, it may be left to a base station, e.g., gNB configuration to make sure the monitoring space from two adjacent beams do not overlap. In a second strategy, the first option described above may be used, if the total number of RS configurations is not large. The first option provides some diversity for the UE in the overlapping region. It is further noted that it can be additionally configured by the base station, e.g., gNB whether to use the first option or the second option, depending on the use case.

In a third strategy, the approach is to introduce an explicit beam index indication in the signal that carries the availability indication. This can be achieved by adding a field in the signal to indicate the beam index. In an alternative in the third strategy, the approach is to introduce an implicit beam index indication in the transmitted signal. This can be achieved via at least one of the following. First, the base station (e.g., gNB) can scramble the transmitted signal with the relevant beam index. Second, the base station (e.g., gNB) can scramble the CRC of the transmitted signal with the relevant beam index.

Signaling of RS Occasion Approaches

In addition to the five options discussed above regarding availability, there is an additional opportunity for addressing RS overhead. When a RS configuration is indicated to be available, the default assumption is that it is available in every periodic occasion. However, not every occasion is needed by idle and/or inactive UEs. Practically speaking, the UE needs only the RS occasion(s) before the paging occasion to facilitate PDCCH/PDSCH decoding, if there is paging available.

The following discussion outlines two enhancements that can be provided to reduce the requirements on the RS presence, which may allow the gNB to reduce unnecessary overhead when the RS is not used by the connected UEs.

In the first enhancement, it can be specified that when a RS configuration is indicated as available, the UE assumes that only the RS occasion(s) before the PO are available. In the second enhancement, if the availability indication is carried in paging early indication, the UE assumes the RS occasion(s) are available when the UE needs to monitor the PO based on the paging early indication. These two enhancements can be used in combination.

Turning to the details of the first enhancement, it can be specified that when a RS configuration is indicated as available, the UE assumes that only certain RS occasion(s) before the PO are available. In this enhancement, there are two alternatives. In the first alternative, N RS occasion(s) immediately before the start of the paging occasion minus an offset (Toffset) are available. As a special case of this first alternative, when N=1, this means that the last RS occasion is available. As another special case, Toffset=0, which means the N RS occasion(s) immediately before the start of the paging occasion are available. FIG. 6A illustrates this first alternative. FIG. 6A shows the paging occasion, and N is set to 3 in this example. Toffset is a non-zero setting that indicates the RS occasion just prior to the paging occasion is not available. The three RS occasions prior to the Toffset are available, while the earliest RS occasion is not available, by virtue of N having the value of 3.

In the second alternative, a similar approach is following, but instead of the parameter N, a time window T0 is used. In the second alternative, the RS occasion(s) within a time window T0 before the start of the paging occasion minus an offset (Toffset) are available. Like the first alternative, in the special case, Toffset=0, which means the RS occasion(s) in the time window T0 immediately before the start of the paging occasion are available. FIG. 6B illustrates this second alternative. FIG. 6B shows the paging occasion, and T0 is sufficiently large to span two RS occasions in this example. Toffset is a non-zero setting that indicates that the RS occasion just prior to the paging occasion is not available. The two RS occasions prior to the Toffset are available, while the earliest RS occasion is not available, by virtue of the size of T0. In the second alternative, the duration of the time window (T0) can be either pre-defined or configured, and/or derived based on the periodicity of the RS configuration.

For both of the above two alternatives, the offset Toffset can be pre-defined or configured. Values of Toffset may also depend on UE capability.

There are other variations of the above two alternatives that are within the scope of aspects of the above disclosure. For example, variations include scenarios where all or part of the RS occasions that overlap with the PO are also included, in addition to the RS occasions before the PO. These occasions can still be potentially used by the UE for time and/or frequency synchronization refinement.

In the second enhancement, a paging early indication is involved and utilized to provide an enhanced availability indication. In this enhancement, if the RS availability indication is carried in paging early indication (PEI), the UE assumes the RS occasion(s) are available only when the UE needs to monitor the PO based on the PEI. In describing this enhancement, there are two types of UE behaviors that may be considered when the UE monitors the PO based on the PEI.

In the first behavior, the UE monitors the PO if the UE detects a positive indication in the PEI; otherwise the UE does not monitor the PO. In the second behavior, the UE does not monitor the PO if the UE detects a negative indication in the PEI; otherwise the UE monitors the PO. In this second behavior, if the UE detects a positive indication in the PEI or if the UE does not detect the PEI at all, then the UE monitors the PO.

The ramifications of each of the two behaviors are as follows. For the first behavior, the UE assumes the RS occasion(s) are available only if the UE detects a positive indication in the PEI. This means that if the gNB has transmitted a negative indication in the PEI or has not transmitted the PEI (no page in the PO), it may omit the RS occasions before the corresponding PO.

For the second behavior, the UE assumes the RS occasion are available only if the UE detects a positive indication in PEI or if the UE does not detect the PEI. This means that if the gNB has transmitted a negative indication in the PEI (no page in the PO), it may omit the RS occasions before the corresponding PO.

FIG. 7A illustrates the second enhancement. In FIG. 7A, the PEI indicates positive paging and indicates the RS as available. The unshaded RS occasions between the PEI and the Paging Occasion are available. Intuitively in this second enhancement, all the RS occasions between the PEI and PO may be assumed to be available when the PEI indicates a positive paging. Alternatively, the UE may assume the RS occasion(s) right after PEI are available, when the PEI indicates a positive paging. The lack of shading in FIG. 7A indicates that those RS occasions are available.

FIG. 7B provides an illustration of combining the first and second enhancements. In FIG. 7B, the PEI indicates positive paging and indicates the RS as available. In FIG. 7B, N is set to 1, and Toffset is set to 0. Based on this information, the UE assumes the RS occasion immediately before the PO is available, as shown by the lack of shading in FIG. 7B.

Figure 8A:
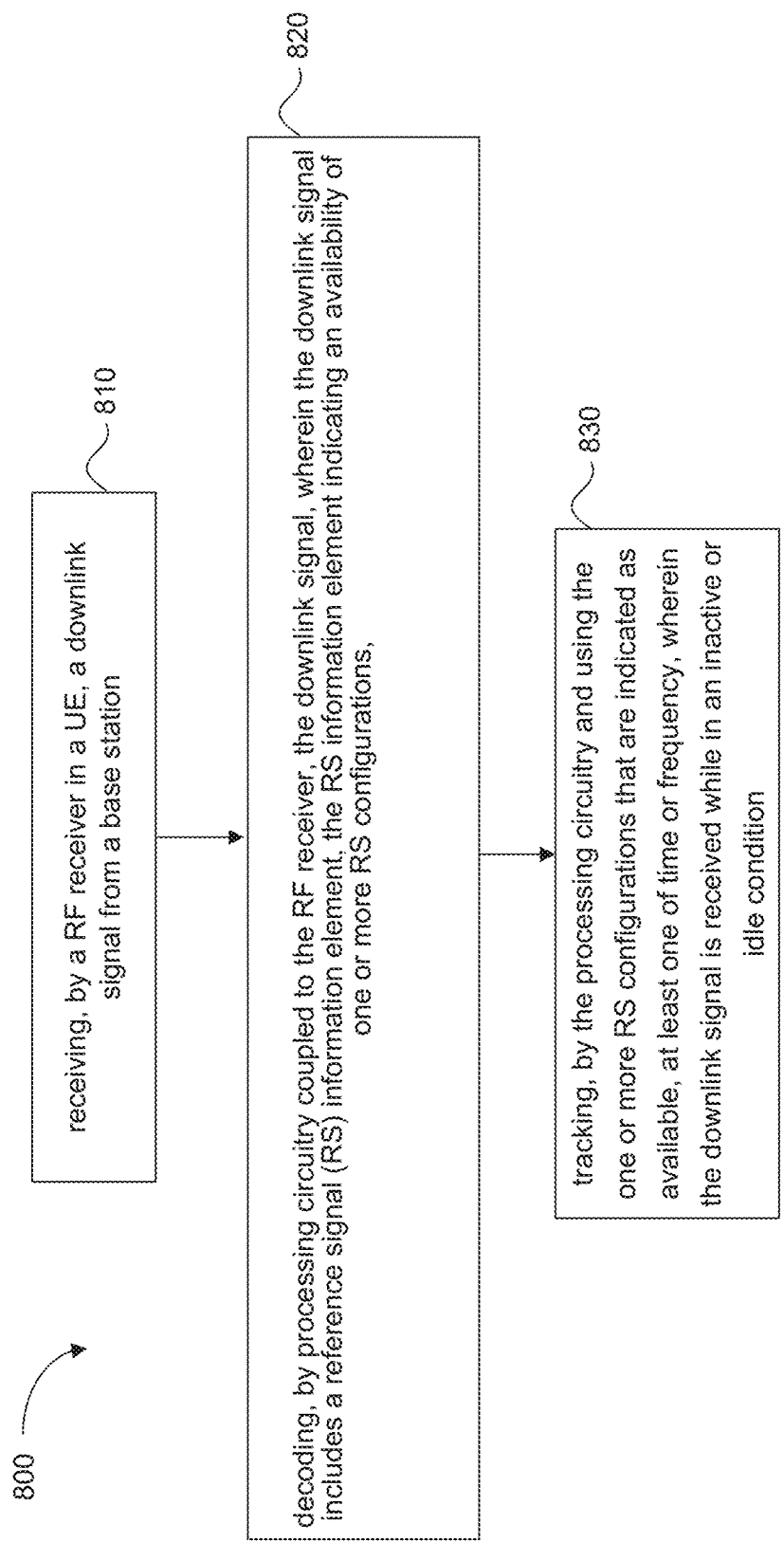
FIG. 8A illustrates a flowchart diagram of a method 800 for a UE to track either time or frequency in a wireless communication system using an efficient RS configuration availability signaling approach, in accordance with aspects of the present disclosure.

FIG. 8A illustrates a flowchart diagram of a method 800 for tracking either time or frequency in a wireless communication system using an efficient reference signal (RS) availability signaling approach, in accordance with aspects of the present disclosure. Step 810 includes receiving, by a radio frequency (RF) receiver in a user equipment (UE), a downlink signal from a base station. Step 820 includes decoding, by processing circuitry coupled to the RF receiver, the downlink signal, wherein the downlink signal includes a reference signal (RS) information element indicating an availability of one or more RS configurations. Step 830 includes tracking, by the processing circuitry and using the one or more RS configurations that are indicated as available, at least one of time or frequency of at least one tracking reference signal, wherein the downlink signal is received while the UE is in an inactive or idle condition.

Figure 8B:
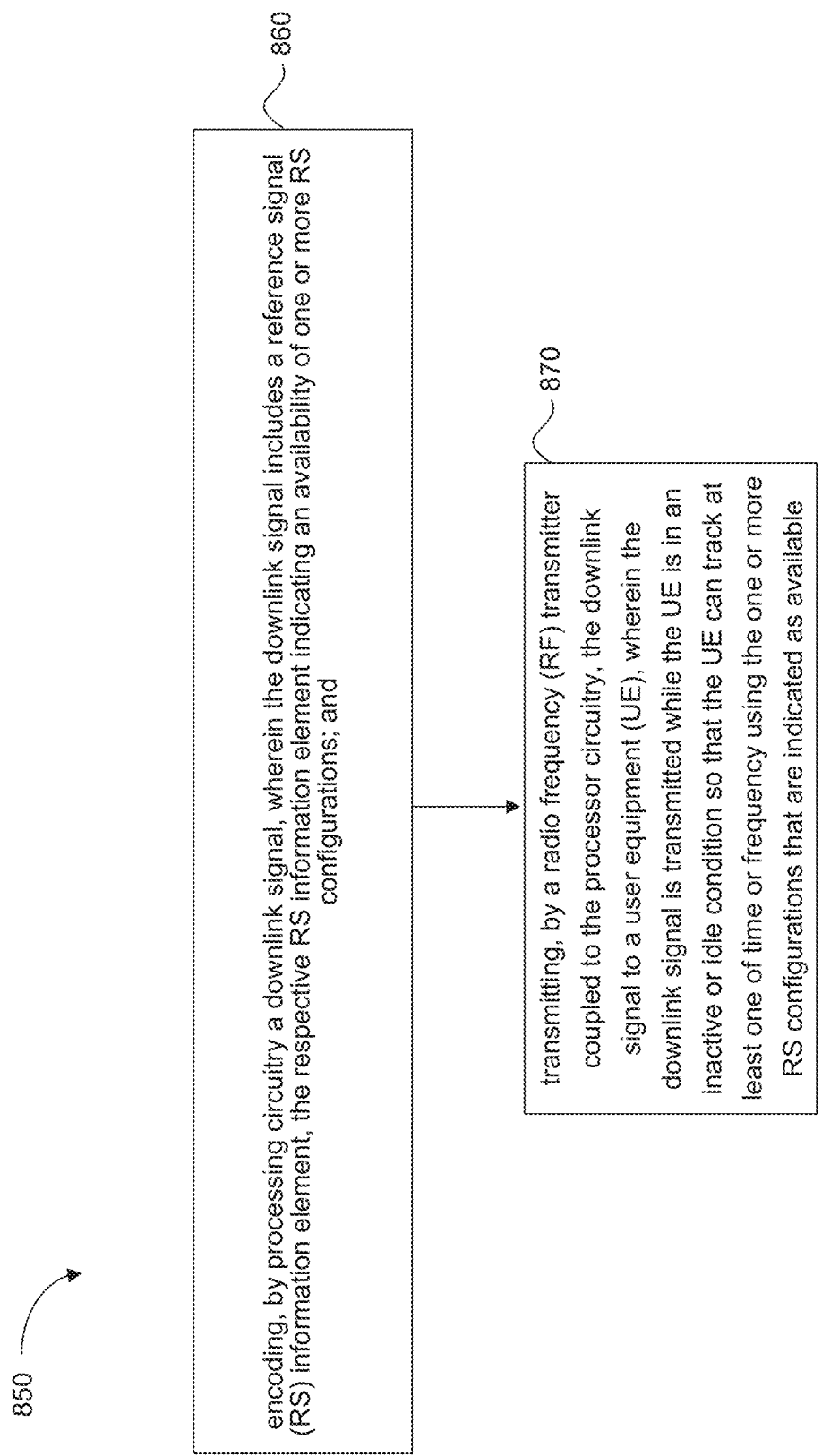
FIG. 8B illustrates a flowchart diagram of a method 850 for a base station to signal a UE so that it can track either time or frequency in a wireless communication system using an efficient RS configuration availability signaling approach, in accordance with aspects of the present disclosure.

FIG. 8B illustrates a flowchart diagram of a method 850 for a base station to signal a UE so that it can track either time or frequency in a wireless communication system using an efficient reference signal (RS) availability signaling approach, in accordance with aspects of the present disclosure. Step 860 includes encoding, by processing circuitry, a downlink signal, wherein the downlink signal includes a reference signal (RS) information element indicating an availability of one or more RS configurations. Step 870 includes transmitting, by a radio frequency (RF) transmitter coupled to the processor circuitry, the downlink signal to a user equipment (UE), wherein the downlink signal is transmitted while the UE is in an inactive or idle condition so that the UE can track at least one of time or frequency using the one or more RS configurations that are indicated as available.

Figure 9:
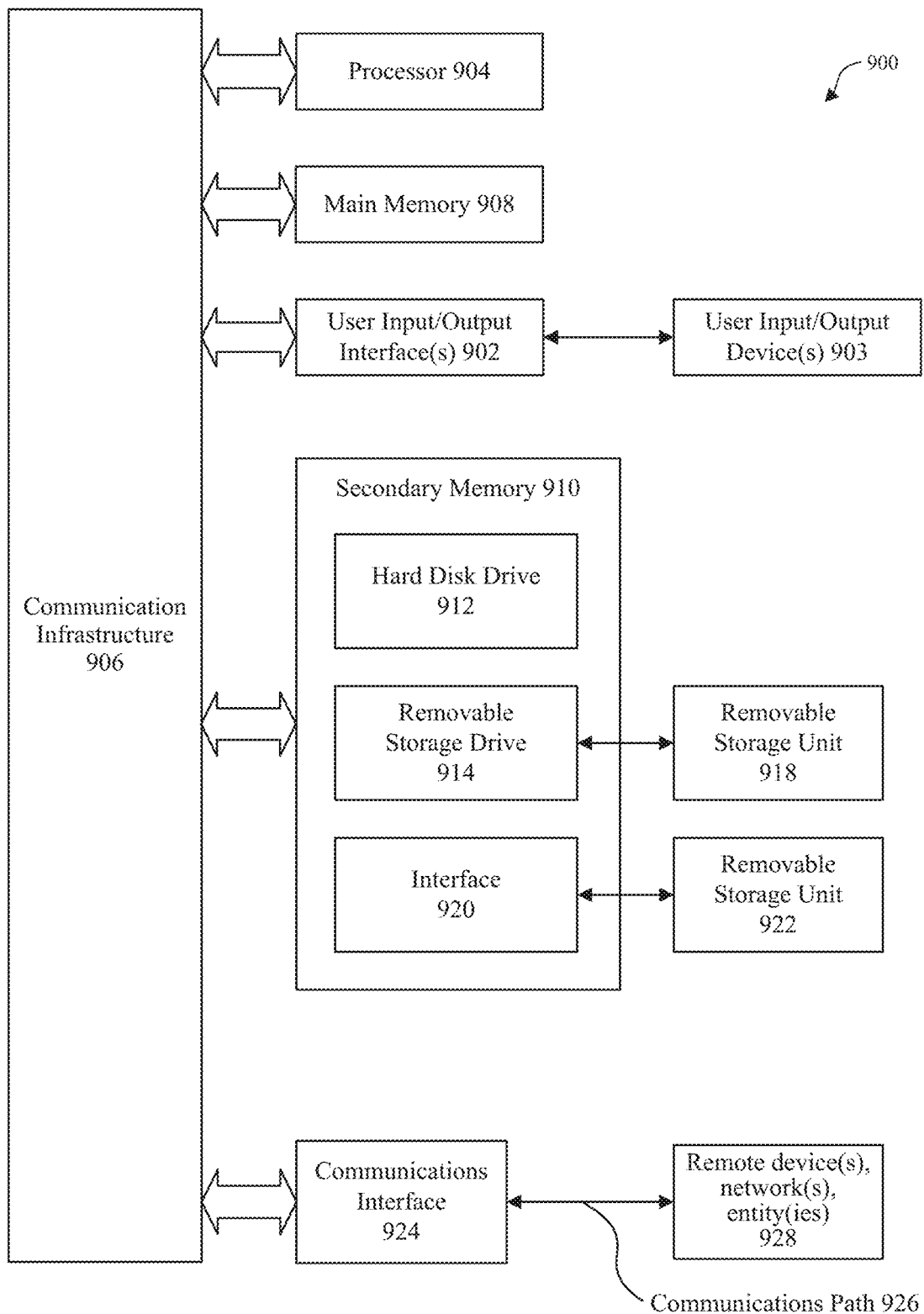
FIG. 9 is an example computer system for implementing some aspects or portion(s) thereof.

Various aspects can be implemented, for example, using one or more computer systems, such as computer system 900 shown in FIG. 9. Computer system 900 can be any well-known computer capable of performing the functions described herein such as devices 101, 103, 105 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and may include any combination of LANs, WANs, the Internet, etc. Control logic and/or data may be transmitted to and from computer system 900 via communication path 926.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspects may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A user equipment (UE) comprising:
 a radio frequency (RF) receiver configured to receive a downlink signal from a base station while the UE is in an inactive or idle condition; and
 processing circuitry coupled to the RF receiver, the processing circuitry configured to:
  decode the downlink signal, wherein the downlink signal includes a reference signal (RS) information element, the RS information element including a bitmap indicating an availability of a first RS configuration set and an availability of a second RS configuration set, the first RS configuration set and the second RS configuration set being mutually exclusive with respect to each other, wherein the RS information element is a two-level hierarchy having a first level and a second level, the first level indicating that members of the first RS configuration set are available and members of the second RS configuration set are not available, and the second level having no bits assigned to the members of the first RS configuration set, the second level indicating availability or unavailability of the members of the second RS configuration set, and use resources of the members of the first RS configuration set and the members of the second RS configuration set that are indicated as available and the RF receiver, to track at least one of time or frequency, wherein at least one of the members of the first RS configuration set and the second RS configuration set includes a tracking reference signal (TRS) configuration.

2. The UE of claim 1, wherein a subset of the members of the second RS configuration set belong to a same beam.

3. The UE of claim 1, wherein the RS information element is carried by a system information block (SIB) signal within the downlink signal, the downlink signal further including a second indication carried by a physical downlink control channel (PDCCH) signal.

4. The UE of claim 1, wherein the processing circuitry determines a number of bits required for the second level based on a maximum number of RS configurations having an indication of unavailability in the first level.

5. The UE of claim 1, wherein a number of bits in the bitmap are predefined in a 3rd Generation Partnership Project (3GPP) specification, or broadcast in a system information block (SIB) signal.

6. The UE of claim 1, wherein the RS information element further includes an indication of a specified number of RS occasions that are available prior to a paging occasion.

7. The UE of claim 1, wherein the RS information element further includes an offset time and an indication of a specified number of RS occasions that are available prior to the offset time before a paging occasion, or further includes an offset time and an indication of a timespan of RS occasions that are available prior to the offset time before the paging occasion.

8. The UE of claim 1, wherein the RS information element further includes an indication of a timespan of RS occasions that are available prior to a paging occasion, or further includes the indication of the timespan of RS occasions that are available prior to the paging occasion, the timespan being based on a periodicity of either the first RS configuration set or the second RS configuration set.

9. The UE of claim 1, wherein the downlink signal is scrambled by a beam index associated with a beam or a cyclic redundancy check (CRC) of the downlink signal is scrambled by the beam index.

10. The UE of claim 1, wherein the RS information element is included in a paging early indication, the RS information element indicating availability of occasions of either the first RS configuration set or the second RS configuration set if between the paging early indication and a paging occasion.

11. The UE of claim 1, wherein the RS information element is included in a paging early indication, the RS information element indicating availability of occasions of either the first RS configuration set or the second RS configuration set if between the paging early indication and a paging occasion, and wherein the UE monitors the paging occasion if the UE detects a positive indication in the paging early indication.

12. A method comprising:
encoding, by processing circuitry a downlink signal, wherein the downlink signal includes a reference signal (RS) information element, the RS information element including a bitmap indicating an availability of a first RS configuration set and an availability of a second RS configuration set, the first RS configuration set and the second RS configuration set being mutually exclusive with respect to each other, wherein the RS information element is a two-level hierarchy having a first level and a second level, the first level indicating that members of the first RS configuration set are available and members of the second RS configuration set are not available, and the second level having no bits assigned to the members of the first RS configuration set, the second level indicating availability or unavailability of the members of the second RS configuration set; and
transmitting, by a radio frequency (RF) transmitter coupled to the processing circuitry, the downlink signal to a user equipment (UE),
wherein the downlink signal is transmitted while the UE is in an inactive or idle condition so that the UE can track at least one of time or frequency using resources within the members of the first RS configuration set and the members of the second RS configuration set that are indicated as available, wherein at least one of the members of the first RS configuration set and the second RS configuration set includes a tracking reference signal (TRS) configuration.

13. The method of claim 12, wherein the RS information element is carried by a system information block (SIB) signal within the downlink signal, the downlink signal further including a second indication carried by a physical downlink control channel (DCCH) signal.

14. The method of claim 12, wherein the processing circuitry determines a number of bits required for the second level based on a maximum number of RS configurations having an indication of unavailability in the first level.

15. The method of claim 12, wherein a number of bits in the bitmap are predefined in a 3rd Generation Partnership Project (3GPP) specification, or broadcast in a system information block (SIB) signal.

16. The method of claim 12, wherein the RS information element further includes an indication of a specified number of RS occasions prior to a paging occasion.

17. The method of claim 12, wherein the RS information element further includes an offset time and an indication of a specified number of RS occasions that are available prior to the offset time before a paging occasion.

18. The method of claim 12, wherein the RS information element further includes an indication of a timespan of RS occasions prior to a paging occasion.

* * * * *